(No Model.)
H. SMITH.
HORSE POWER MACHINE.
No. 264,483. Patented Sept. 19, 1882.
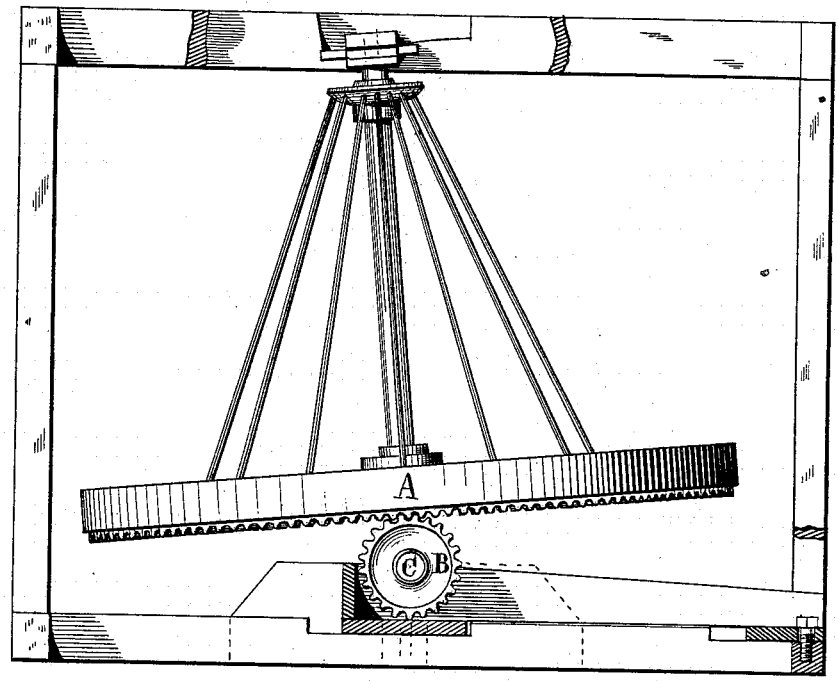
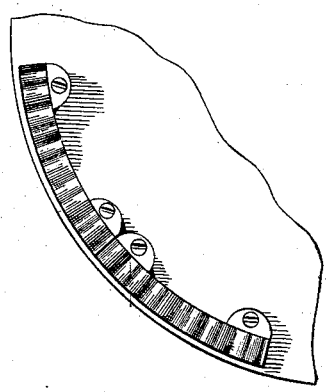
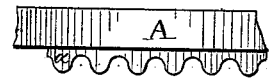
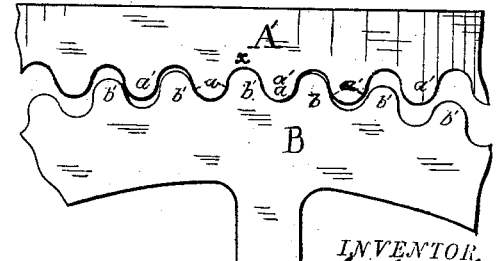
WITNESSES
F. H. Knight
A. J. Henderson
INVENTOR
H. Smith
By H. J. Abbot
Attorney
N. PETERS, Photo-Lithographer, Washington, D. C.

UNITED STATES PATENT OFFICE.

HEMPHILL SMITH, OF SHELBY COUNTY, TENNESSEE.

HORSE-POWER MACHINE.

SPECIFICATION forming part of Letters Patent No. 264,483, dated September 19, 1882.

Application filed June 29, 1882. (No model.)

*To all whom it may concern:*

Be it known that I, HEMPHILL SMITH, a citizen of the United States of America, residing in the county of Shelby, and State of Tennessee, have invented certain new and useful Improvements in Horse-Power Machines; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention has relation to certain improvements in horse-power machines, and particularly to certain parts of my patent of March 4, 1879, No. 212,993.

This improvement consists in placing beneath the rim of the wheel a toothed rack to correspond with teeth in the bearing-wheel, all of which will be hereinafter more particularly described.

In the drawings, herewith accompanying and forming part of this specification, Figure 1 is an elevation of the wheel and bearing-pinion. Fig. 2 is a portion of the segment-rack. Fig. 3 is an under side view of segments. Fig. 4 is an enlarged view of a part of the pinion and a segment.

A is the wheel on which the animals are placed for the power.

B is the pinion-wheel on shaft C, to which shaft is attached a band-wheel or any other means of communicating motion, as fully described in my patent above referred to, and which needs no further description here.

In Fig. 4 is represented (enlarged) the peculiar form of the teeth which I employ to communicate motion from the power-wheel A to the driven pinion B.

In my former patent above referred to friction between the power-wheel and the pinion was obtained by coating the under side of the rim of the wheel with a mixture of paint and fine sand or other gritty substance. As the friction-wheel supports the rim of the wheel and also the weight of the animals, the wheel chafes the rim and is not durable if many animals are employed. I therefore use segment-racks, (which are to be bolted to the under side of the wheel A, as represented in Fig. 3, and any one of which segment-racks may be removed and replaced by a new segment in case of breakage of a cog or tooth without removing all of the segment-racks,) with teeth of peculiar construction, as represented (enlarged) in Fig. 4. The teeth $a$ in the segment-rack A', as also the teeth $b$ in pinion B, are formed by similar-sized circles from the centers $a'$ and $b'$.

In Fig. 4 it will be observed that at $x$ the tooth $b$ is in contact exactly with the hollow between the teeth of the segment-rack, and on each side the teeth $a\ a$ of the rack are not in as close contact with the corresponding recesses in the pinion-wheel B. Hence as each single tooth $b$ of the pinion rises the same result follows, which is owing to the form of the teeth in the pinion and segment-rack—viz., semicircular. The teeth being of this exact shape renders them strong and less liable to wear with the great weight of the wheel and animals placed thereon.

I claim—

In horse-power machines, a power-wheel having segment-racks bolted to its under side near the rim, any one of which segment-racks can be removed when required without removing all of said segment-racks, in combination with a correspondingly-cogged pinion upon which the said segment-racks work and impart motion when the power-wheel is revolved, substantially as described.

In testimony whereof I affix my signature in presence of two witnesses.

HEMPHILL SMITH.

Witnesses:
 W. B. SIMONTON,
 J. W. WILLES.